United States Patent [19]
Koide

[11] Patent Number: 5,335,938
[45] Date of Patent: Aug. 9, 1994

[54] AIR BAG APPARATUS
[75] Inventor: Teruhiko Koide, Aichi, Japan
[73] Assignee: Kabushiki Kaisha Tokai-Rika-Denki-Seisakusho, Aichi, Japan
[21] Appl. No.: 25,238
[22] Filed: Mar. 2, 1993
[30] Foreign Application Priority Data Mar. 5, 1992 [JP] Japan .................. 4-011215[U]

[51] Int. Cl.⁵ .............................................. B60R 21/16
[52] U.S. Cl. ............................................... 280/728 B
[58] Field of Search ........... 280/728 R, 728 A, 728 B, 280/730 R, 731, 732, 743

[56] References Cited
U.S. PATENT DOCUMENTS

4,852,907 8/1989 Shiraki et al. .................. 280/728 B

Primary Examiner—Karin L. Tyson
Attorney, Agent, or Firm—Fisher & Associates

[57] ABSTRACT

An insert plate is embedded in an air bag cover, and is provided with an insert supporting portion, a pair of insert expanding portions and a coupling portion for coupling the insert expanding portions. Notches are provided in the insert supporting portion on both sides of the coupling portion. Terminals of a H-shaped rupture portion are positioned on inclined surfaces of the insert supporting portion. Accordingly, when the air bag cover expands due to a vehicle decelerating rapidly, a rupture is generated along the inclined surfaces, and an expansion occurs with a position offset by the notches as an expansion center line. Therefore, the air bag cover can be ruptured along a predetermined rupture line, and expand to the maximum.

10 Claims, 8 Drawing Sheets

AIR BAG APPARATUS

BACKGROUND OF THE INVENTION

1. Field of the Invention

The present invention relates to an air bag apparatus including an air bag cover which is expanded by a bag body toward a vehicle occupant when the vehicle rapidly decelerates, and an insert member embedded in the air bag cover.

2. Description of the Related Art

Figure 6:
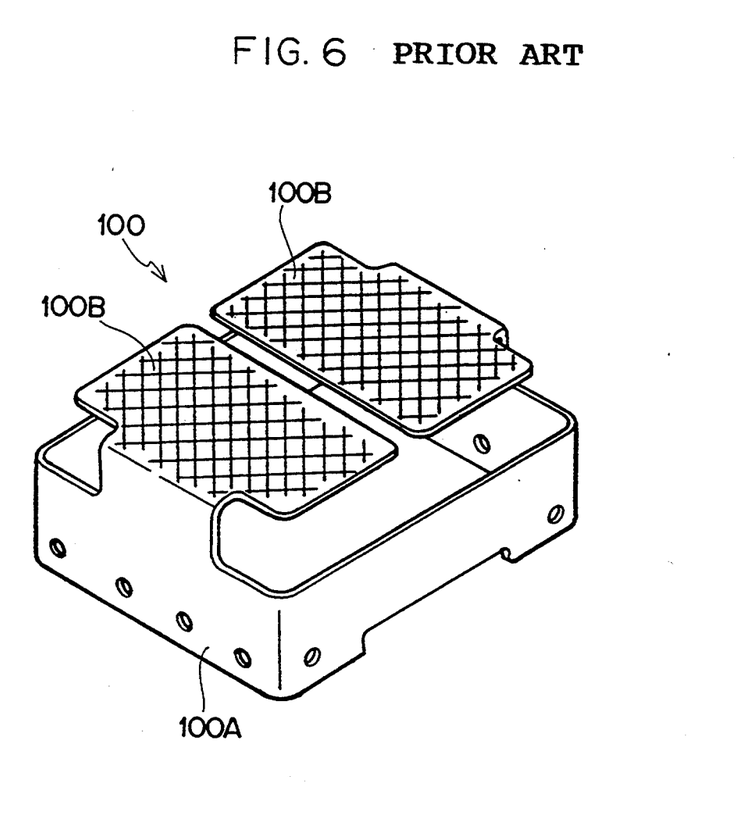
FIG. 6 is a perspective view showing a conventional insert plate.

An air bag apparatus, for example, an air bag apparatus of a type which is mounted on a steering wheel is provided with an insert plate 100 as shown in FIG. 6. The insert plate 100 includes a frame-like insert supporting portion 100A and a pair of insert expanding portions 100B opposed to each other.

Figure 7:
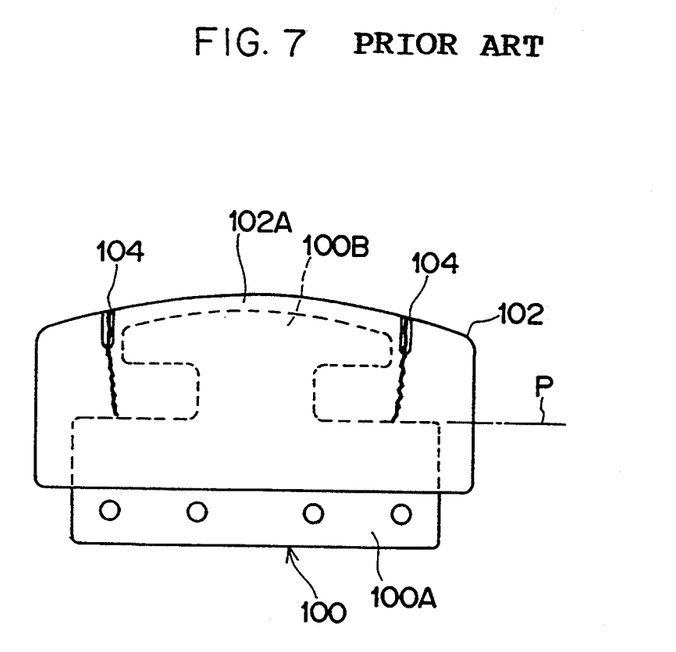
FIG. 7 is a side view showing a rupture lines of other conventional air bag apparatus including the insert plate of FIG. 4 when the air bag cover is ruptured.

As shown in FIG. 7, the insert plate 100 is embedded in an air bag cover 102 by insert molding. The air bag cover 102 is provided with, for example, a substantially H-shaped rupturing portion 104 as seen from the side of an occupant. Thus, the air bag cover 102 is pressed by an expanding bag body (not shown) so as to be ruptured along the rupturing portion 104 and expand when a vehicle decelerates rapidly.

At this time, an expansion center line is positioned at a boundary between the insert expanding portion 100B embedded in the expanding portion 102A of the air bag cover 102 and the insert supporting portion 100A. That is, an edge line P of the insert supporting portion 100A on the occupant side serves as the expansion center line.

Even if the expanding portion 102A of the air bag cover 102 is expanded with the edge line P on the occupant side as an expansion center, an expansion operation of the bag body is not blocked. However, it is desired to enhance expanding performance of the bag body by expanding the expanding portion 102A greater.

Figure 8:
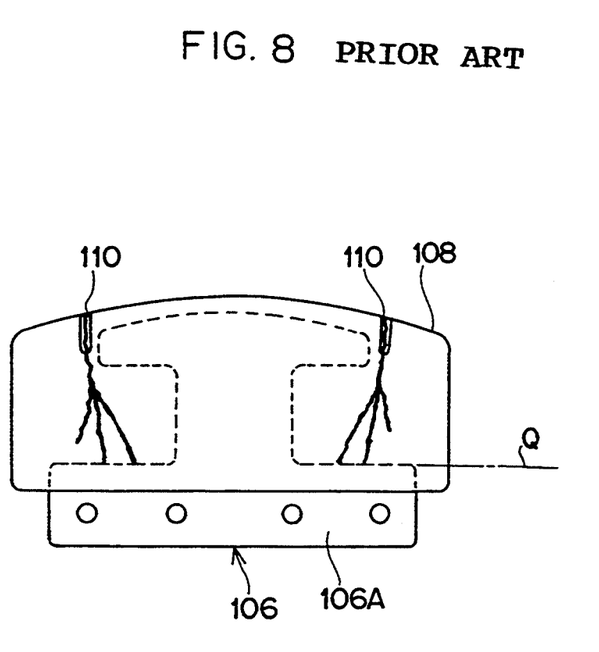
FIG. 8 is a side view of another conventional air bag apparatus illustrating a condition of rupture lines when an expansion center line is offset.

In this case, it is possible to satisfy the above requirement by using an insert plate 106 shown in FIG. 8. That is, in the insert plate 106, the height of an insert supporting portion 106A is reduced so as to set an expansion center line Q at a position which is offset on the side opposite the occupant by a predetermined interval away from the edge line P on the side of the occupant side.

However, in case the expansion center line P is simply offset to the expansion center line Q as set forth above, terminals of a rupturing portion 110 are branched when the air bag cover 108 is ruptured, resulting in various rupture lines. That is, there is a problem in that it is impossible to rupture and expand the air bag cover 108 at a predetermined position.

SUMMARY OF THE INVENTION

In view of the facts set forth above, it is an object of the present invention to provide an air bag apparatus which can be ruptured along a predetermined rupture line so as to expand to the maximum.

In order to overcome the problem, an air bag apparatus is provided including an air bag cover accommodating a bag body in a folded state, the bag body expanding toward the side of an occupant when a vehicle decelerates rapidly, and having a brittle rupture portion along a predetermine line, and an insert member embedded in the air bag cover so as to reinforce the air bag cover, and expanding by the air bag cover being ruptured along the rupture portion by the expanding bag body. In the air bag apparatus, the insert member has an insert expanding portion embedded in a cover expanding portion of the air bag cover which is ruptured so as to expand, and an insert supporting portion for supporting the expanding insert expanding portion. An expansion center line of the insert expanding portion is offset on the side opposite an expanding direction by a predetermined interval away from an edge line which is positioned on the side of the expanding direction of the bag body in the insert supporting portion. Inclined portions for connecting the expansion center line and the edge line are provided between the offset expansion center line and the edge line, and terminal portions of the ruptured portion are positioned on the inclined portions as seen from the side of the occupant.

According to the air bag apparatus constructed as set forth above, the bag body is folded and accommodated in the air bag cover, and expands when the vehicle decelerates rapidly. Therefore, the air bag cover is pressed by the expanding bag body, and is ruptured along the brittle rupture portion along the predetermined line. Accordingly, the cover expanding portion of the air bag cover expands, and the bag body expands toward the side of the occupant.

At this time, the insert expanding portion embedded in the cover expanding portion expands while the insert expanding portion is supported by the insert supporting portion. The expansion center line of the insert expanding portion is offset on the side opposite to the expanding direction by the predetermined interval away from the edge line which is positioned on the side of the expanding direction of the bag body in the insert supporting portion. Hence, the insert expanding portion can expand to the maximum. Accordingly, the cover expanding portion of the air bag cover also expands to the maximum. As a result, it is possible to reduce expansion resistance to the bag body, and at the same time enhance expansion performance.

Further, the inclined portion for connecting the expansion center line and the edge line is provided between the offset expansion center line and the edge line, and a terminal portion of the rupture portion is positioned on the inclined portion as seen from the side of the occupant. Accordingly, the air bag cover is ruptured along the inclined portion when the air bag cover is ruptured along the rupture portion. Therefore, according to the present invention, the air bag cover is uniformly ruptured at a predetermined position (i.e., the rupture line) while the expansion center line is offset on the side of the direction opposite to the expanding direction.

DESCRIPTION OF THE PREFERRED EMBODIMENTS

A description will now be given of one embodiment of an air bag apparatus 10 of the present invention with reference to FIGS. 1 to 3.

Figure 3:
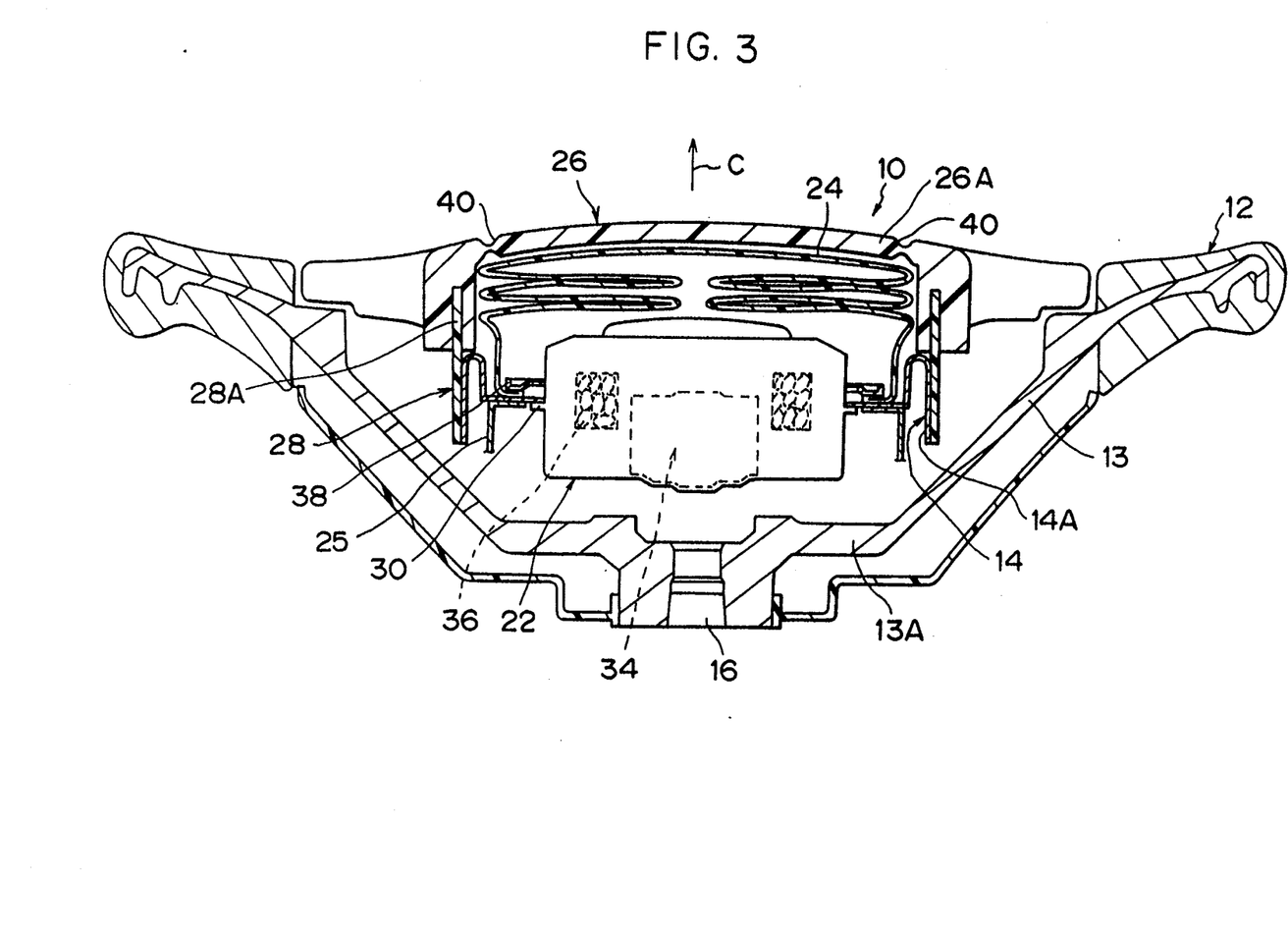
FIG. 3 is a sectional view of the air bag apparatus including the air bag cover and the insert plate of FIG. 1.

FIG. 3 is a sectional view of the air bag apparatus 10. The air bag apparatus 10 is mounted through a supporting bracket 16 of a hub 13A which is provided on a core bar 13 of a steering wheel 12.

Further, the air bag apparatus 10 is provided with a substantially box-shaped base plate 14. A supporting flange 14A is bent in U-shape so as to open toward the side opposite an occupant, and is provided integrally with an outer peripheral portion of the base plate 14. A circular hole not shown is provided in an intermediate portion of the base plate 14. The base plate 14 is provided with an inflator 22, a bag body 24, an inflator cover 25, and an insert plate 28 which is embedded in an air bag cover 26

The inflator 22 is provided in a substantially cylindrical form, and the half of the inflator 22 on the side of the occupant (i.e., on the side of the direction shown by the arrow marked C in FIG. 3) is arranged to pass through the circular hole of the base plate 14. A rectangular flange 30 extending to the radial direction of the inflator 22 is formed at an axial intermediate portion of the inflator 22 . The inflator 22 is secured to a surface of the base plate 14 on the side opposite the occupant (i.e., on the side opposite the direction shown by the arrow marked C in FIG. 3) through the flange 30 by unillustrated bolts or the like. Further, a plurality of gas holes (not shown) are provided at predetermined intervals in a peripheral surface of the inflator 22 on the side of the occupant.

A starting device 34 is disposed in a shaft center portion of the inflator 22, and is actuated when the vehicle decelerates rapidly. Further, an unillustrated detonator, an unillustrated booster, and gas generating material 36 is accommodated in an outer peripheral portion of the inflator 22. A plurality of kinds of filters (not shown) are disposed between the gas generating material 36 and the gas holes. Therefore, when the vehicle decelerates rapidly, the starting device 34 is actuated to ignite the detonator. Consequently, the gas generating material 36 combusts through the booster so as to generate a great amount of gas. The gas is cooled and crushed pieces are removed from the gas by using a filter, and thereafter the gas is guided through the gas holes into the bag body 24 as will be described.

The bag body 24 is folded on the occupant side of the base plate 14, and is disposed so as to cover a portion of the inflator 22 on the occupant side in the axial direction of the inflator 22. An edge of the bag body 24 on the opening side is mounted to a substantially intermediate portion of the base plate 14 through a ring plate 38. The ring plate 38 is clamped to the base plate 14 with unillustrated bolts, and serves to press the edge of the opening side of the bag body 24 to the base plate 14.

The inflator cover 25 is box-shaped, and accommodates a portion of the inflator 22 opposite the occupant. Contact plates (not shown) are provided integrally with both sides of the inflator cover 25 on the side of the inflator cover 25 opposite the occupant. When the occupant presses the air bag cover 26 toward the side opposite the occupant, the contact plates are conducted to horn contacts.

Figure 1:
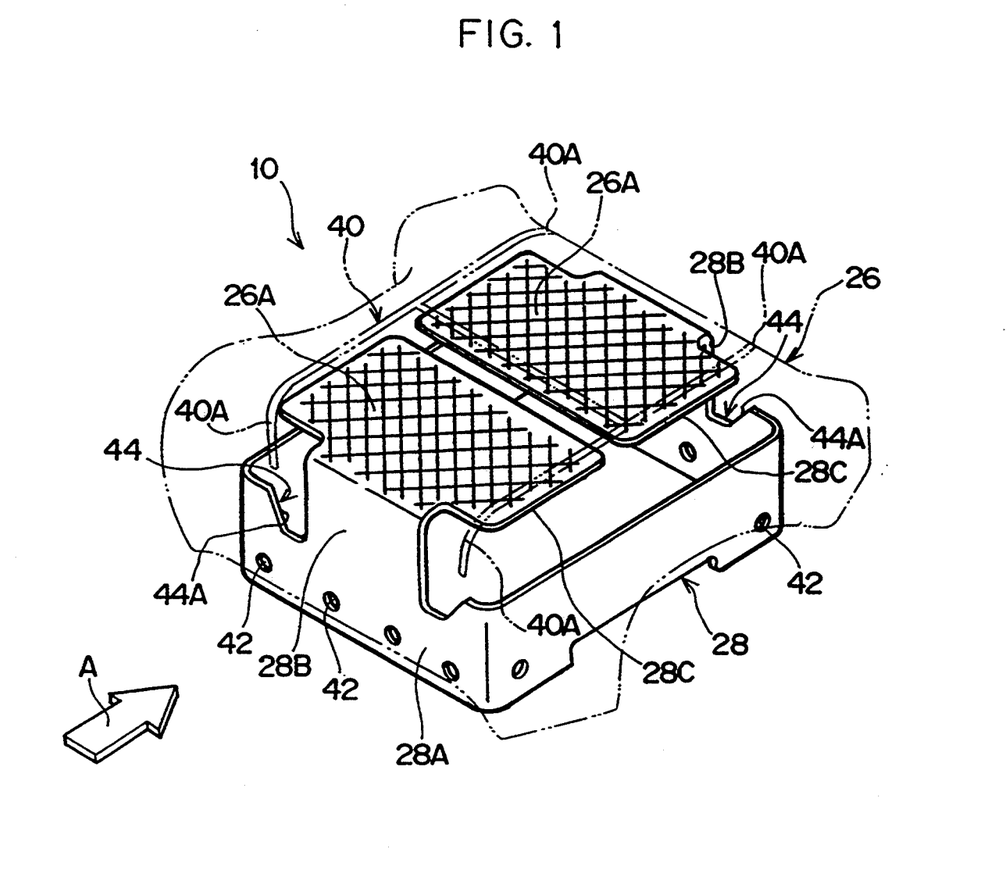
FIG. 1 is a perspective view of one embodiment of an air bag apparatus of the present invention, showing an air bag cover and an insert plate.
Figure 2:
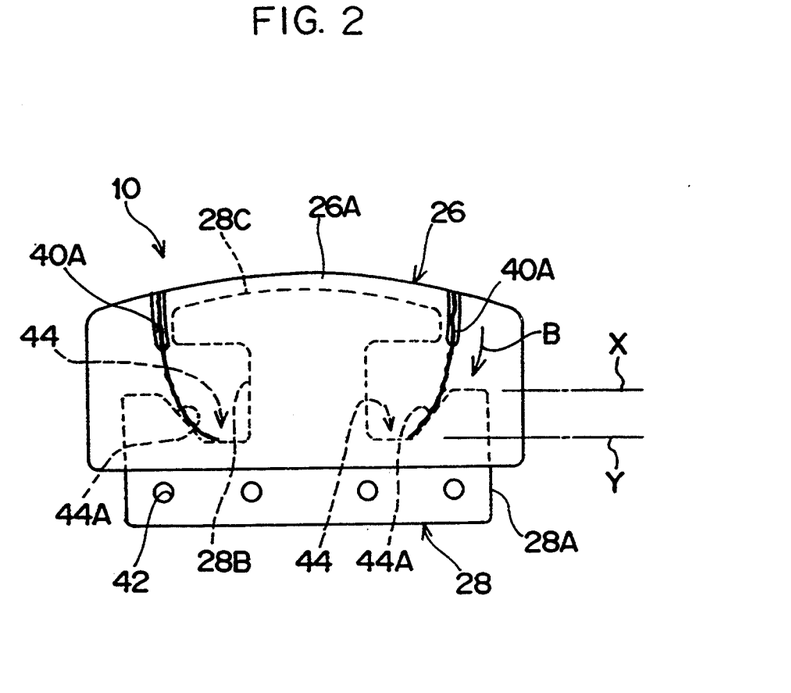
FIG. 2 is a side view of the air bag apparatus of FIG. 1 as seen from a direction shown by the arrow marked A in FIG. 1.

As shown in FIG. 1, the air bag cover 26 is made of urethane, and is provided in a box-shaped form including a top wall portion and side portions. As seen from the side of the occupant, the top wall portion is provided with substantially H-shaped rupture portions 40. The rupture portion 40 is formed by decreasing the thickness of the urethane wall (see FIG. 3). Portions surrounded by the rupture portion 40 are defined as cover expanding portions 26A of the air bag cover 26. That is, the air bag cover 26 is ruptured along the rupture portion 40 when the vehicle decelerates rapidly, and the pair of cover expanding portions 26A are ruptured in directions away from each other.

The resinous insert plate 28 serving as an insert member is embedded in the air bag cover 26 by insert molding. Though the insert plate 28 is made of resin, it may be made of metal such as aluminum. The insert plate 28 is provided with a substantially frame-shaped reinforcing portion 28A. Insert supporting portions of the present invention correspond to portions of the reinforcing portion 28A opposed to each other (hereafter using the same reference numeral as that of the reinforcing portion 28A when referring to the "insert supporting portion" of the reinforcing portion 28A, that is, referred to as insert supporting portion 28A). Mesh-like and rectangular insert expanding portions 28C are provided integrally with the respective insert supporting portions 28A via coupling portions 28B (see FIG. 1). The insert expanding portions 28C are embedded in the pair of cover expanding portions 26A of the air bag cover 26. A plurality of mounting holes 42 are provided in appropriate positions of the reinforcing portion 28A of the insert plate 28. The insert plates 28 are secured to the supporting flanges 14A of the base plate 14 (see FIG. 3) by, for example, rivets passing through the mounting holes 42.

In the insert plate 28 set forth above, inverted trapezoidal notches 44 are provided in both sides of the coupling portion 28B in the transverse direction. Accordingly, an expansion center hypothetical line Y (see FIG. 2) of an insert expanding portion 28C can be offset by a predetermined distance on the side of the direction opposite the expanding direction (i.e., on the side opposite the occupant) with respect to an edge line X (see FIG. 2) on the side of the expanding direction (i.e., on the side of the occupant) of the bag body 24 in the pair of insert supporting portion 28A, i.e. a hypothetical line X which extends along an uppermost periphery of the supporting portion. Further, inclined surfaces 44A serving as inclined portions extend so as to connect between the edge line X and the expansion center line Y. A terminal 40A of the substantially H-shaped rupture portion 40 as seen from the occupant side is positioned on the inclined surface 44A.

A description will now be given of the operation of the embodiment.

When the vehicle is in normal operation, the starting device 34 does not actuate so the bag body 24 does not expand. Accordingly, the air bag cover 26 does not rupture at the rupture portion 40.

However, when the vehicle decelerates rapidly from the normal condition, the starting device 34 actuates so that the gas generating material 36 combusts through the detonator and the booster. Hence, a great amount of gas is generated, and is injected into the bag body 24 so as to be expanded. Consequently, the air bag cover 26 is ruptured by the expanded bag body 24 along the rupture portion 40 so that the cover expanding portions 26A expand in respective directions away from each other. As a result, the bag body 24 instantaneously expands toward the occupant side.

In the embodiment, the terminals 40A of the rupture portion 40 are positioned on the inclined surfaces 44A of the guide notches or portions 44 which are provided in the inserting supporting portions 28A of the insert plate 28. Therefore, when the air bag cover 26 is ruptured at the rupture portion 40 while the cover expanding portions 26A are expanding, the terminals 40A of the rupture portion 40 are ruptured along the inclined surfaces 44A with the direction shown by the arrow marked B in FIG. 2 as the rupture direction. Thus, when the air bag cover 26 ruptures and the cover expanding portions 26A expand, it is possible to provide a smooth and uniform rupture line along the predetermined rupture line without the ruptured line branching out. Further, there is an additional effect in that it is possible to enhance the outer appearance of the air bag cover 26 when expanding.

In the embodiment, the expansion center of the cover expanding portion 26 which has been ruptured and expanded as set forth above corresponds to the expansion center line Y which is offset with respect to the edge line X on the side of the expanding direction of the insert plate 28. Accordingly, the cover expanding portions 26A can be expanded to the maximum. As a result, it is possible to reduce expansion resistance of the bag body 24, and enhance expansion performance when expanding.

Figure 4:
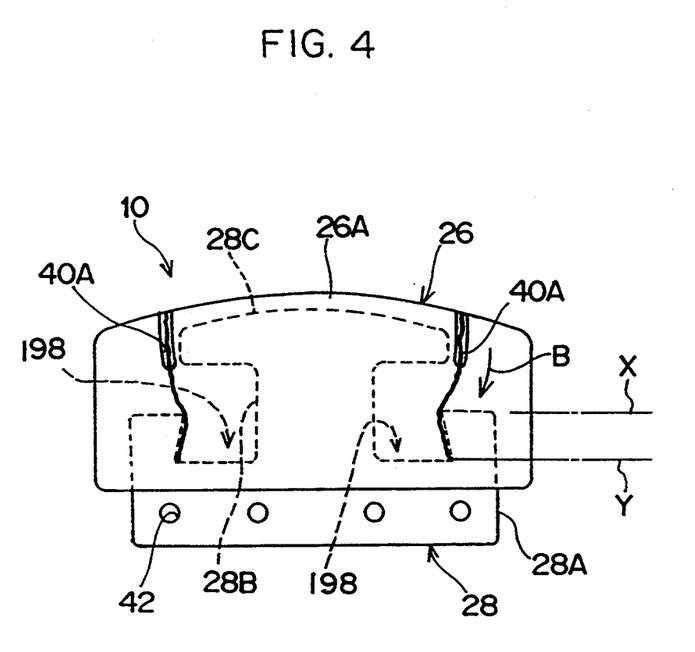
FIG. 4 is a side view showing a modified embodiment of an insert member of the air bag apparatus

In the embodiment, the inverted trapezoidal guide notches or portions 44 are provided in the insert supporting portion 28A of the insert plate 28 so that the inclined surfaces 44A are inclined so as to be lowered in an inclined direction from the outside toward the inside. However, it must be noted that the inclined surface may be inclined in the opposite direction such as the inclined surface 198 shown in FIG. 4.

Figure 5:
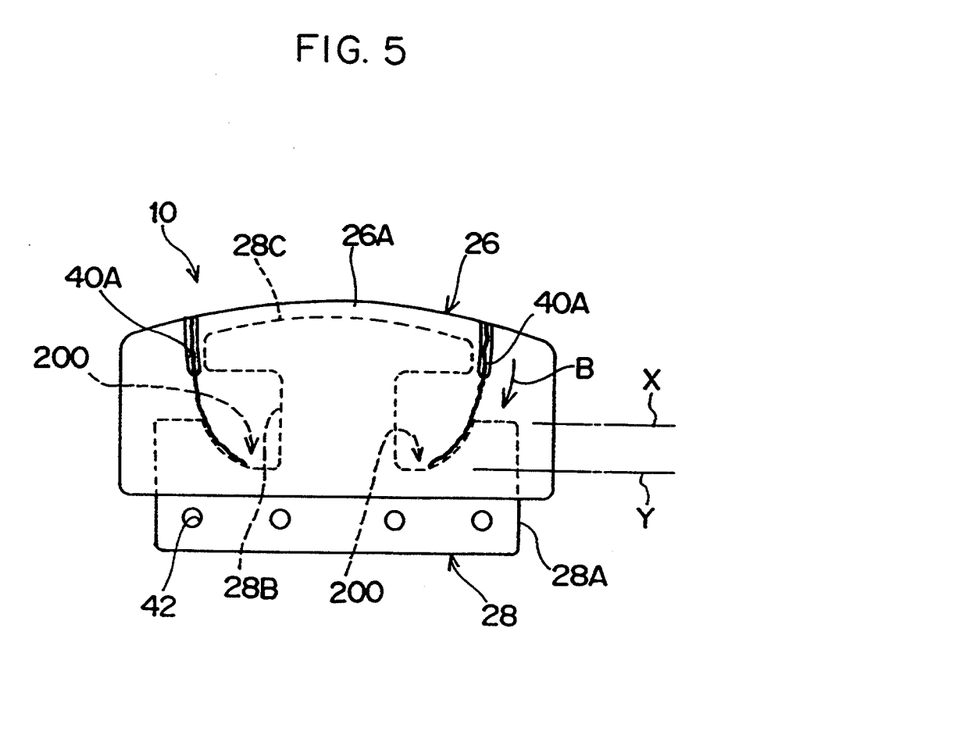
FIG. 5 is a side view showing another modified embodiment of the insert member of the air bag apparatus.

In the embodiment, the inclined surface 44A serving as the inclined portion is a plane. However, the inclined surface may be a circular arc surface 200 such as that shown in FIG. 5.

Further, in the embodiment, the rupture portion 40 provided in the air bag cover 26 is provided with a substantially H-shaped form as seen from the side of the occupant. However, the rupture portion 40 may be provided in a channel shaped form.

What is claimed is:

1. An air bag apparatus comprising:
   an air bag cover accommodating a bag body in a folded state, said bag body being expandable toward an occupant when a vehicle decelerates rapidly, and having an upper wall and a brittle portion to rapture along a predetermined line provided in said upper wall: and
   an insert member embedded in said air bag cover so as to reinforce said air cover;
   said insert member having an upper expandable portion embedded in upper wall of said air bag cover to expand together with said upper wall of said air bag cover, and a lower supporting portion for supporting said upper expandable portion, and, a coupling portion which couples said upperexpandable portion and said lower supporting portion; and
   guide notch portions provided in said lower supporting portion at both sides of said coupling portion so as to be adjacent to said coupling portion;
   wherein a first hypothetical line representing a center of expansion of said insert member is provided between said coupling portion and said lower supporting portion, said first hypothetical line being positioned lower than a second hypothetical line which extends along an uppermost periphery of said lower supporting portion, and said guide notch portions being respectively defined between said second hypothetical line and said first hypothetical line and guiding rupture of said air bag cover by allowing said brittle portion to rupture downwardly into a portion corresponding to said guide notch portion and by allowing a center of expansion of said insert member to be positioned along said first hypothetical line, 2. An air bag apparatus according to claim 1, wherein each of said guide notch portions is formed in a circular arc shape.

3. An air bag apparatus according to claim 1, wherein each of said guide notch portions includes an inclined surface extending from said first hypothetical line toward said second hypothetical line in a direction away from said insert member.

4. An air bag apparatus according to claim 1, wherein each of said guide notch portions includes an inclined surface extending from said second hypothetical line toward said first hypothetical line in the direction away from said member.

5. An air bag apparatus according to claim 1, wherein said upper expandable portion has meshes.

6. An insert member accommodating a bag body in a folded state under an air bag cover, said air bag body being expandable toward an occupant when a vehicle decelerates rapidly and is embedded in said air bag cover so as to reinforce said air bag cover which includes a brittle portion to rapture along a predetermined line, said insert member comprising:
   a frame body embedded in outer peripheral side wall portions of said air bag cover;
   coupling members upwardly extending from an upper periphery of said frame body and embedded in said outer peripheral side wall portions of said air bag cover;
   expanding members being transversely and oppositely extending from upper distal ends of said coupling members in parallel with said upper periphery of said frame body, and embedded in a top portion of said air bag cover; and
   guide notches provided in said frame body at both side portions of said coupling members so as to be adjacent to said coupling portion, said guide notches being defined between a first hypothetical line representing a center of expansion of said insert member and a second hypothetical line which extends along an uppermost periphery of said frame body, said first hypothetical line positioned lower than said second hypothetical line.

7. An insert member according to claim 6, wherein said expanding members are meshed.

8. An insert member according to claim 6, wherein said guide notches are provided in a circular arc form extending toward each of said coupling members from said upper periphery of said frame body.

9. An insert member according to claim 6, wherein each of said guide notches include an inclined surface extending toward each of said coupling members from said upper periphery to said frame body, and a bottom surface extending from a terminal of said inclined surface toward each of said coupling members.

10. An insert member according to claim 6, wherein each of said guide notches includes an inclined surface extending in the direction opposite to each of said coupling members from said upper periphery of said frame body, and a bottom surface extending from a terminal of said inclined surface toward each of said coupling members.

* * * * *